March 2, 1943. P. GILLI ET AL 2,313,013
CHARGING CRANE FOR FIRELESS LOCOMOTIVES
Filed July 6, 1940 2 Sheets-Sheet 1
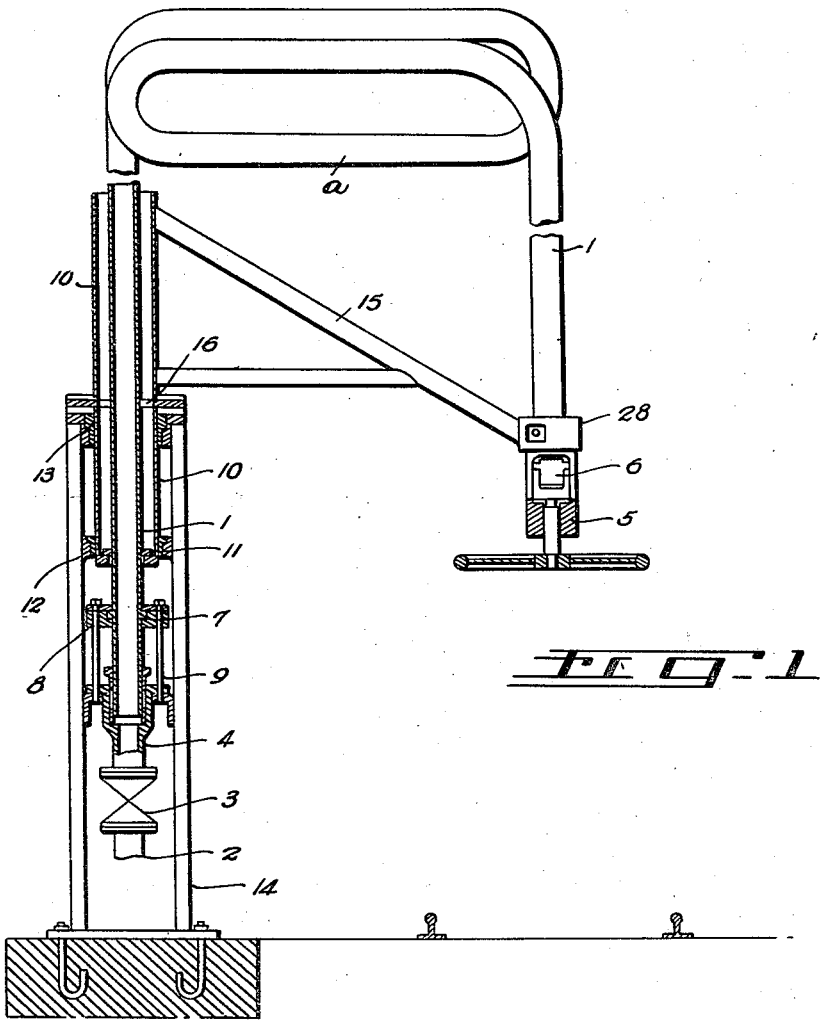
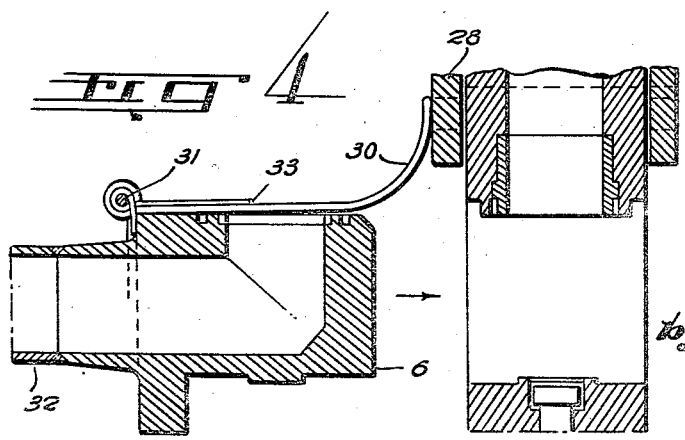

March 2, 1943. P. GILLI ET AL 2,313,013
CHARGING CRANE FOR FIRELESS LOCOMOTIVES
Filed July 6, 1940 2 Sheets-Sheet 2
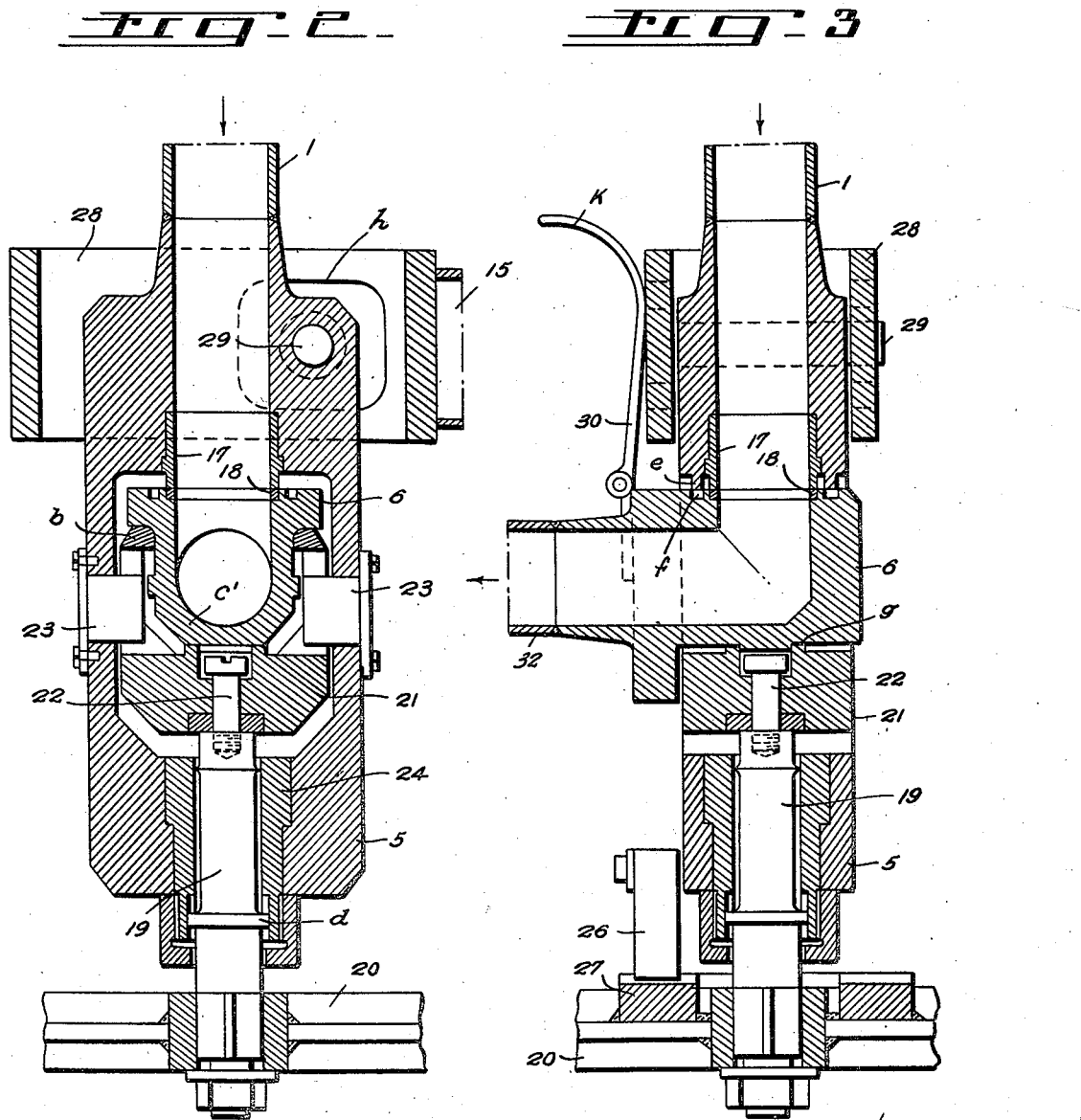

Patented Mar. 2, 1943

2,313,013

UNITED STATES PATENT OFFICE 2,313,013

CHARGING CRANE FOR FIRELESS LOCOMOTIVES

Paul Gilli and Karl Velan, Vienna, Germany; vested in the Alien Property Custodian Application July 6, 1940, Serial No. 344,287
In Germany July 6, 1939

8 Claims. (Cl. 299—77)

The invention relates to a charging crane for fireless locomotives or steam accumulating locomotives. Charging crane is the expression for the movable connecting device which connects the charging conduit with the locomotive.

This connection must be able on the one hand to equalize the unavoidable deviations from the normal distance of the locomotive from the crane and on the other hand to take up the heat expansions in the crane occurring after the crane has been connected with the locomotive and the steam admission has been opened. All connecting points must be reliably steamtight.

For fireless locomotives with low accumulator pressure (10 atmospheres to at the utmost 20 atmospheres) the charging crane was constructed up to the present so that it could be oscillated in a rotatable stuffing box about a vertical axis and so that the horizontal distance could be adjusted by means of a second shiftable stuffing box connection. Differences in the height position of the locomotive connection were equalized thereby, that the packing face in the locomotive connection was constructed as a ball and was consequently more or less insensitive against differences in the angle of inclination of the connection.

This known type of the charging crane is not suitable for fireless locomotives having high accumulator pressure (about 30-150 atmospheres). The shiftable stuffing box ought to be tightened so strongly that the connection can no longer be adjusted by hand when the locomotive is connected. Further, unless a complicated relieved stuffing box connection is employed, an inadmissibly high stressing would occur in the steam pipe of the crane. Finally a perfect packing of the connecting point on the locomotive is possible at high pressures only if the packing ring is so strongly compressed that lasting shape-alterations occur. This, however, absolutely excludes the employment of spherical packing faces which often are deformed in different positions.

According to the invention the charging crane for fireless locomotives with high accumulator pressure is constructed so that it is connected with the steam admission by means of a stuffing box turnable about a vertical axis, and the connection with the locomotive is effected by a connecting tube which is elastically constructed in such a manner that it equalizes the unavoidable differences in the distance between locomotive and charging crane. The required elasticity of the connecting tube can be attained in different manners, for instance by constructing it as curved tube of corresponding height or by interposition of a curved tube, a tube loop, wire spirals or similar elastic tube parts in the connecting tube. To employ pressure-proof metal hoses is also advisable.

The packing faces on the connecting points between crane and locomotive are, according to the invention, plane or conical and packed by means of a metallic packing ring.

The tube of the crane ends in a bow, in which the charging head of the locomotive is guided and pressed against the packing point of the bow by means of a spindle turnable in a screw threaded sleeve of the bow, so that a secure packing is obtained.

In order to avoid excessive stressing of the whole connection, especially of the bow and of the spindle, when the charging head becomes warm during the charging of the locomotive a fork-shaped intermediate piece is inserted, according to the invention, between the spindle and the charging head, whereby only a fraction of the heat expansion of the charging head acts as stressing.

An embodiment of the invention is illustrated in the accompanying drawings, in which Fig. 1 shows in elevation the total arrangement of the crane, Fig. 2 shows in elevation partly in section the connecting point between crane and locomotive, Fig. 3 is a section reversed relative to Fig. 2; and Fig. 4 is a cross-sectional view of a portion of the apparatus shown in Fig. 3, but with certain of the parts in different positions.

In Fig. 1 the elastic connecting tube of the crane is designated by 1 and forms a bow with interposed tube loop $a$. From the steam admission 2 the steam flowing to the locomotive passes through a shutting off device 3 to the casing 4 of the stuffing box and through the connecting tube 1 to the bow 5 by which the connection with the charging head 6 on the locomotive is established. The tube 1 is connected with the casing 4 by a turnable stuffing box so that the crane is oscillatable about a vertical axis. As at the high steam pressures a strong axial shifting of the tube 1 occurs, this axial force is transmitted by a collar 7 upon the bridge 8 and further by the connecting screw 9 upon the stuffing box casing 4.

The ascending arm of the connecting tube 1 is connected with a turnable tube 10 by means of a flange 11. The turnable tube itself is guided on the bearing points 12 and 13 in the upright 14 of the crane in which also the casing 4 of the stuffing box is fixed.

A guide arm 15 for bow 5 is fixed near the upper end of the rotary tube 10. At the connecting point for the upper and lower parts of the rotary tube 10 a guide piece 16 for the connecting pipe 1 is mounted.

The upright 14 of the crane may either be fixed on the wall of a building or it is free standing. A particularly suitable form of the latter type of construction consists therein that the upright is arranged accurately at the middle between two tracks so that locomotives at the right or left of the charging crane can be selectively connected with the crane.

Figs. 2 and 3 show the connection between the crane and the locomotive in plan view and partly in cross-section. The connecting tube 1 terminates in the bow 5, into which a seat 17 of corrosion-proof material is steam-tightly pressed. A packing ring 18 is tightly pressed between the seat 17 and the charging head 6 of the locomotive by means of a spindle 19 and hand wheel 20.

The tightening force is not transmitted directly by spindle 19 upon the charging head 6 but by an interposed fork-shaped intermediate piece 21 so that it is avoided that by the heat expansion which occurs when the charging head 6 becomes hot inadmissibly high stressings, especially in the spindle 19 and the bow 5, are produced.

The screw 22 which, when the hand wheel is turned in the direction of opening, moves downwards the fork-shaped piece 21 enables the simple disconnecting of the connection. The charging head 6 is also pulled off by means of the projecting ledge c from the packing 18 by the projections b of the fork-shaped piece 21. The fork-shaped piece 21 is guided in the bow 5 by guide pieces 23. A conduit 32 connected with the locomotive is connected to the charging head 6.

The stroke of the spindle 19 is limited by a collar d which moves in an aperture of a threaded bush 24 and bears against the cap nut 25 at the downward movement.

In order to avoid damaging of the packing faces when the charging head 6 is oscillated into the bow 3, projecting noses e are provided on the bow 5, which when the charging head 6 is pushed-in prevent touching and therefore damaging of the seat 17. Only when the seat faces of the bow 5 and of the charging head 6 are in the same central position the packing can be tightened, the noses e engaging in corresponding cavities in the charging head 6.

The charging head is centered in the fork-shaped piece 21 by means of the groove g.

For securing the connection against accidental opening, for instance by unauthorized persons or against automatic opening by shaking or by other similar influences, a pawl 26 is arranged according to the invention on the bow 5 and engages in a ratchet wheel 27 mounted on the hand wheel 20, so that the hand wheel may be actuated for the closing, but for the opening the pawl must first be lifted.

The bow 5 is guided in a guiding frame 28 fixed on the carrying arm 15 and relative to the turning axis of the charging crane axially and radially with clearance, but tangentially without clearance. The axial and radial clearance must be at least plus-minus 10 mm. wide in order to securely equalize, according to the invention, the actually changing position of the charging head relative to the charging crane. According to the form of construction illustrated this clearance is limited by apertures h provided in the guide frame 28 in which a bolt 29, fixed on the bow 5, can freely move. Owing to the fact that any clearance in tangential direction is avoided every stressing of the connecting tube 1 when oscillated inwards is avoided, as the closed circuit passes through the carrying arm 15 to the stuffing box.

For protecting against dirt settling in the inlet opening of the charging head 6 and in the adjacent tube 24 this inlet opening may be closed by a lid 30 turnable about the fulcrum 31 and pressed down on the opening by spring force. The end k of this lid is curved, so that, as shown in Fig. 4, when the charging crane is moved towards engagement with the head, the curved part of the lid strikes the crane and the lid is automatically lifted off the aperture, and automatically pressed down by the spring to cover the opening when the head is disconnected from the crane.

Several other forms of construction of a charging crane are possible according to the invention, for instance the descending arm of the connecting tube 1 may be held in the highest position by a carrying spring in order to ensure an easy inward oscillating of the charging head of the locomotive, the carrying spring being fixed on the arm 15. The axial movement of the stuffing box may be taken up by a roller bearing.

We claim:

1. A charging device for fireless high pressure steam locomotives including a vertically extending steam supply line, an upright support, a tubular member having a vertical portion pivotally carried by said support, means including a stuffing box for connecting said tubular member to said supply line, said tubular member including a second vertical portion connected to the first-mentioned vertical portion by means of a loop portion, a yoke carried by the lower end of said second vertical portion and adapted to receive the charging head of a locomotive, and bracing means pivotally mounted on said support and connected to said yoke.

2. A charging device for fireless high pressure steam locomotives including a vertically extending steam supply line, an upright support, a tubular member having a vertical portion pivotally carried by said support, means including a stuffing box for connecting said tubular member to said supply line, said tubular member including a second vertical portion connected to the first-mentioned vertical portion by means of a loop portion, a yoke carried by the lower end of said second vertical portion and adapted to receive the charging head of a locomotive, bracing means pivotally mounted on said support, and means for connecting said bracing means to said yoke providing play in all directions in the vertical plane passing through the pivotal axes of said bracing means and preventing play in a direction normal to said plane.

3. A charging device for fireless high pressure steam locomotives including a vertically extending steam supply line, an upright support, a tubular member having a vertical portion pivotally carried by said support, means including a stuffing box for connecting said tubular member to said supply line, said tubular member including a second vertical portion connected to the first-mentioned vertical portion by means of a loop portion, a yoke carried by the lower end of said second vertical portion and adapted to receive the charging head of a locomotive, a bracing arm pivotally mounted on said support, a collar carried by the free end of said arm and embracing said yoke, and a pin carried by said yoke and extending into an aperture in said collar having a greater diameter than that of the pin, whereby limited play is provided between said bracing arm and said yoke.

4. A charging device for fireless high pressure steam locomotives including a vertically extending steam supply line, an upright support, a tubular member having a vertical portion pivotally carried by said support, means including a stuffing box for connecting said tubular member to said supply line, said tubular member including a second vertical portion connected to the first-mentioned vertical portion by means of a loop portion, a yoke carried by the lower end of said second vertical portion and adapted to receive the charging head of a locomotive, a clamping screw carried by said yoke for securing said head in steam-tight relationship with said lower end, and bracing means pivotally mounted on said support and connected to said yoke.

5. A charging device for fireless high pressure steam locomotives including a vertically extending steam supply line, an upright support, a tubular member having a vertical portion pivotally carried by said support, means including a stuffing box for connecting said tubular member to said supply line, said tubular member including a second vertical portion connected to the first-mentioned vertical portion by means of a loop portion, a yoke carried by the lower end of said second vertical portion and adapted to receive the charging head of a locomotive, a clamping screw carried by said yoke for securing said head in steam-tight relationship with said lower end, a hand wheel for turning said screw, a ratchet wheel secured to said hand wheel, a pawl pivotally mounted on said yoke for engaging said ratchet wheel to lock said screw against rotation, and bracing means pivotally mounted on said support and connected to said yoke.

6. A charging device for fireless high pressure steam locomotives including a vertically extending steam supply line, an upright support, a tubular member having a vertical portion pivotally carried by said support, means including a stuffing box for connecting said tubular member to said supply line, said tubular member including a second vertical portion connected to the first-mentioned vertical portion by means of a loop portion, a yoke carried by the lower end of said second vertical portion and formed with a seat for engaging a corresponding seat formed on the charging head of a locomotive, a protecting ring on said yoke and surrounding the seat thereon and adapted to enter a groove formed in said head, and bracing means pivotally mounted on said support and connected to said yoke.

7. A charging device for fireless high pressure steam locomotives including a vertically extending steam supply line, an upright support, a tubular member having a vertical portion pivotally carried by said support, means including a stuffing box for connecting said tubular member to said supply line, said tubular member including a second vertical portion connected to the first-mentioned vertical portion by means of a loop portion, a charging head carried by a locomotive and formed with an upwardly directed opening, a yoke carried by the lower end of said second vertical portion and adapted to receive said charging head, bracing means pivotally mounted on said support and connected to said yoke, and a cover for said opening pivotally connected to said head and formed with a curved lip adapted to contact said yoke as the head is inserted thereinto to thereby pivot the cover to an inoperative position.

8. A charging device for fireless high pressure steam locomotives including a vertically extending steam supply line, an upright support, a tubular member having a vertical portion pivotally carried by said support, means including a stuffing box for connecting said tubular member to said supply line, said tubular member including a second vertical portion connected to the first-mentioned vertical portion by means of a loop portion, a yoke carried by the lower end of said second vertical portion and formed with openings in opposite sides whereby a charging head of a locomotive may be inserted into said yoke from opposite directions, and bracing means pivotally mounted on said support and connected to said yoke.

PAUL GILLI.
KARL VELAN.